(12) United States Patent
Wehking

(10) Patent No.: US 6,561,942 B2
(45) Date of Patent: May 13, 2003

(54) DUAL MODE VARIABLE RATIO TRANSMISSION

(75) Inventor: Jeffrey Bodley Wehking, Ann Arbor, MI (US)

(73) Assignee: General Motors Corporation, Detroit, MI (US)

( * ) Notice: Subject to any disclaimer, the term of this patent is extended or adjusted under 35 U.S.C. 154(b) by 2 days.

(21) Appl. No.: 09/877,995

(22) Filed: Jun. 11, 2001

(65) Prior Publication Data

US 2002/0187872 A1 Dec. 12, 2002

(51) Int. Cl.⁷ .............................................. F16H 37/02
(52) U.S. Cl. ........................................ 475/216; 475/211
(58) Field of Search ................................ 475/207, 209, 475/211, 214, 215, 216, 219

(56) References Cited

U.S. PATENT DOCUMENTS

| | | | |
|---|---|---|---|
| 3,340,749 A | * 9/1967 | Magg et al. ................. | 475/211 |
| 4,644,821 A | * 2/1987 | Sumiyoshi et al. ......... | 475/211 X |
| 4,682,518 A | * 7/1987 | Takada et al. .............. | 475/209 X |
| 4,836,049 A | * 6/1989 | Moan .......................... | 475/211 X |
| 5,238,460 A | * 8/1993 | Esaki et al. ................. | 475/216 X |
| 5,401,221 A | * 3/1995 | Fellows et al. ............. | 475/216 X |
| 5,607,372 A | 3/1997 | Lohr ............................ | 475/216 |
| 5,643,121 A | * 7/1997 | Greenwood et al. ....... | 475/214 X |
| 5,720,687 A | * 2/1998 | Bennett ...................... | 475/216 X |
| 5,888,160 A | * 3/1999 | Miyata et al. .............. | 475/216 |
| 5,980,414 A | * 11/1999 | Larkin ......................... | 475/211 |
| 5,980,420 A | 11/1999 | Sakamoto et al. .......... | 476/10 |
| 6,099,431 A | * 8/2000 | Hoge et al. ................. | 475/216 |
| 6,344,008 B1 | * 2/2002 | Nagano et al. ............. | 475/211 X |

FOREIGN PATENT DOCUMENTS

| | | | | |
|---|---|---|---|---|
| DE | 3543635 | * | 6/1986 | ............ 475/211 |
| JP | 404300449 | * | 10/1992 | ............ 475/214 |
| WO | 9221896 | * | 12/1992 | ............ 475/211 |

* cited by examiner

Primary Examiner—Saul Rodriquez
Assistant Examiner—Roger Pang
(74) Attorney, Agent, or Firm—Leslie C. Hodges

(57) ABSTRACT

A powertrain includes a continuously variable traction drive unit, a two-mode planetary gear set, and transfer gearing between the continuously variable unit (CVU) and the planetary gear unit. The planetary gear unit is essentially a four-node linkage mechanism having two members of each gear set interconnected. One member of one of the gear sets is connected to the CVU through a low range clutch and one of the interconnected members is connectable with the CVU through a high range clutch and another member is continuously connected with a prime mover, such as an engine. The planetary gear unit is controlled to provide a low mode that is controllable through the ratio of the CVU to establish a reverse range, a neutral condition, and a forward range. The planetary gear unit is also controllable to provide a high mode wherein the output the CVU and a mechanical path are combined at one gear set to provide a split drive, wherein a portion of the power is transmitted by the CVU and a portion of the power is transmitted by the more efficient mechanical path.

5 Claims, 1 Drawing Sheet

DUAL MODE VARIABLE RATIO TRANSMISSION

TECHNICAL FIELD

This invention relates to transmissions having a continuously variable ratio unit combined with a planetary gear arrangement.

BACKGROUND OF THE INVENTION

Continuously variable power transmissions have been proposed for use in automotive vehicles for more than one hundred years. These proposed transmissions include a continuously variable unit, usually a traction drive or V-belt, combined with a gearing arrangement, which can be either a planetary gear arrangement or a parallel axis arrangement or a combination thereof. The planetary gear arrangement may have one or more planetary gear sets. Most of the proposals have been for single mode type arrangements wherein all of the power passes through the CVU in a single forward mode, and in a reverse mode. A dedicated gearing mechanism is also required to provide a reverse range. A launch device, such as a coupling or a starting clutch is generally required.

Some of the more recent proposals have been for a single or dual mode geared neutral type transmission. To achieve a geared neutral condition, at least one planetary gear set must be used as a summing differential, wherein the speed from the transmission input and the CVU output are applied to two nodes of the gear set to provide a resultant speed at the third node of the gear set. The third node is the output node which is connected with the transmission output. When the CVU is set to a specific ratio, relative to the transmission input speed, the transmission output will be stationary regardless of the transmission input speed. This geared neutral condition eliminates the need for a starting device, such as a torque converter, when the vehicle is stopped. The vehicle is launched from this geared neutral condition by changing the CVU ratio gradually to change the resultant speed of the transmission output toward either the reverse or forward direction without the need for a starting device.

Another function of the summing differential is to combine the power flow from two parallel power paths within the transmission. One path is through the CVU and the other is through fixed ratio gearing, which is generally the more efficient path.

Geared neutral transmissions are inherently inefficient in the low mode due to recirculating power through the CVU. Most of the known CVU transmissions have all of the power passing through the CVU in the high mode, which also limits the transmission efficiency.

SUMMARY OF THE INVENTION

It is an object of the present invention to provide an improved continuously variable ratio transmission having two ranges of operation.

In one aspect of the present invention, a planetary gear arrangement having two interconnected planetary gear sets is disposed between an input shaft, a continuously variable unit, and a transmission output shaft.

In another aspect of the present invention, two torque transmitting mechanisms are disposed within the transmission to connect the output of the continuously variable unit with selected members of the planetary gear sets.

In yet another aspect of the present invention, the planetary gear set has one member continuously driven by the transmission input shaft and one member in each of the planetary gear sets continuously connected with the transmission output shaft.

In still another aspect of the present invention, the output portion of the continuously variable unit is connected with a member of the planetary gear arrangement to provide rotation of that member in a direction opposite to the directional rotation of the input member.

In yet still another aspect of the present invention, the output of the continuously variable unit is connected to a mechanical drive mechanism and a selectively engageable clutch to establish a rotary input to one member of the planetary gear arrangement in the same direction as the rotary input of the input shaft to the planetary gear arrangement.

In a further aspect of the present invention during a first mode of operation, a geared neutral condition, a reverse range of operation, and a forward range of operation are provided.

In a still further aspect of the present invention, a second mode of operation is provided during which the forward range of operation is extended and the power output of the transmission input shaft and the continuously variable unit are combined to provide a split power mode of operation.

In yet still another aspect of the present invention, the interchange from a first mode to the second mode occurs with a synchronous shift wherein the rotating components of the clutch to be engaged have a synchronous rotating speed during the interchange.

In yet still a further aspect of the present invention, the planetary gear arrangement is a four-node summing differential arrangement having two clutches which selectively allow two modes of operation wherein one mode provides a geared neutral and the other mode provides a high efficiency split power path between the transmission input and the transmission output.

In yet still a further aspect of the present invention, only one of the gear sets is active during the high mode of operation to provide greater efficiency.

DESCRIPTION OF AN EXEMPLARY EMBODIMENT

Figure 1:
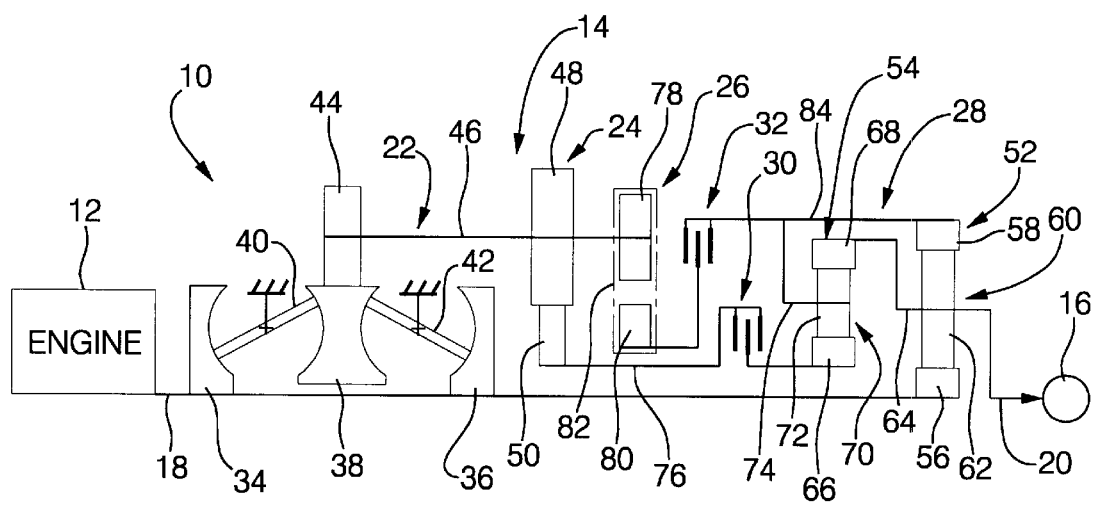
FIG. 1 is a schematic representation of a powertrain incorporating the present invention.

A powertrain 10, shown in FIG. 1, includes an engine or prime mover 12, a continuously variable power transmission 14, and a final drive arrangement 16. The continuously variable power transmission 14 has an input shaft 18 that is continuously driven by the engine 12, and an output shaft 20 that is continuously connected with the final drive arrangement 16. The continuously variable power transmission 14 also includes a continuously variable ratio traction drive unit (CVU) 22, a transfer gear arrangement 24, a transfer chain drive arrangement 26, a four-node planetary gear arrangement 28, a first torque transmitting mechanism 30 and a second torque transmitting mechanism 32.

The CVU 22 includes a pair of input discs 34 and 36 that are continuously connected with the input shaft 18 and a pair of output discs combined in a single member 38 that are disposed in tractional drive relationship with the input discs 34 and 36 through a plurality of rollers 40 and 42, respectively. The output disc 38 meshes with a gear member 44 that is drivingly connected through a shaft 46 with a transfer gear 48 that is a component of the transfer gear arrangement 24. The transfer gear arrangement 24 also includes a transfer gear 50 that meshes with the transfer gear 48.

The planetary gear arrangement 28 includes a pair of planetary gear sets 52 and 54. The planetary gear set 52 includes a sun gear 56 continuously connected with the input shaft 18, a ring gear 58 and a planet carrier assembly member 60 which includes a plurality of pinion gears 62 meshing with the sun gear 56 and ring gear 58 and being rotatably mounted on a planet carrier 64 that is continuously connected with the output shaft 20.

The planetary gear set 54 includes a sun gear 66, a ring gear 68 and a planet carrier assembly member 70. The planet carrier assembly member 70 includes a plurality of pinion gears 72 which are rotatably mounted on a planet carrier 74 and disposed in meshing relationship with the sun gear 66 and the ring gear 68. The carrier 74 is continuously connected with the ring gear 58. The ring gear 68 is continuously connected with the carrier 64 and therefore the output shaft 20.

The transfer gear 50 is drivingly connected through a sleeve shaft 76 with the torque transmitting mechanism 30. The torque transmitting mechanism 30 is a conventional fluid operated clutch which, when engaged, will selectively connect the sleeve shaft 76 with the sun gear 66, such that the sun gear 66 and the transfer gear 50 will rotate in unison. Thus, the sun gear 66 will rotate in the same direction as the output disc 38 of the CVU 22.

The shaft 46 is also connected with a sprocket 78 that is drivingly connected with a sprocket 80 through a conventional chain drive 82. The sprocket 80 is drivingly connected with the torque transmitting mechanism 32. The torque transmitting mechanism 32 is a conventional fluid operated selectively engageable clutch which, when engaged, will provide a drive connection between the sprocket 80 and the ring gear 58 through a hub 84. The ring gear 58 will rotate in a direction opposite the rotational direction of the output disc 38 when the clutch 32 is engaged.

During the low mode operation, the clutch 30 is engaged and the clutch 32 is disengaged. With this mode established, the input power from the engine is connected to both the CVU 22 and the sun gear 56. The output of the CVU via the gearing 44 and transfer gear 24 and the clutch 30 is connected with the sun gear 66. The sun gear 66 rotates in a direction opposite the direction of rotation of the sun gear 56. Depending upon the rotary speed of the sun gear 66, the output shaft 20 can be rotated opposite to the engine rotation, in the same direction as the engine rotation or be zero at a neutral condition.

To establish the high mode of operation, the clutch 32 is engaged while the clutch 30 is disengaged. Under this arrangement, the sun gear 56 and the input discs 34 and 36 are rotated in the same direction as the input shaft 18, and the gear member 44 is also rotated in the same direction as the input shaft 18. The chain drive 26 transmits the rotary speed of the gear 44 to the ring gear 58 in a direction the same as the direction of rotation of the input shaft 18. Thus, in the high range or high mode, the ring gear 58 and sun gear 56 are rotated in the same direction. This will result in the output shaft 20 being also rotated in this direction at a speed dependent upon the speed of the sun gear 56, the speed of the ring gear 58, and the tooth ratio of the ring gear 58 and sun gear 56.

As the rotary speed of the output disc 38 is varied due to the positioning of the rollers 40 and 42, the speed of the ring gear 58 will also vary. The speed of sun gear 56 will remain constant as long as the engine speed remains constant. By increasing the speed of the ring gear 58, the speed of the output shaft 20 will increase and by decreasing the speed of the ring gear 58, the speed of the output shaft 20 will decrease.

Figure 2:
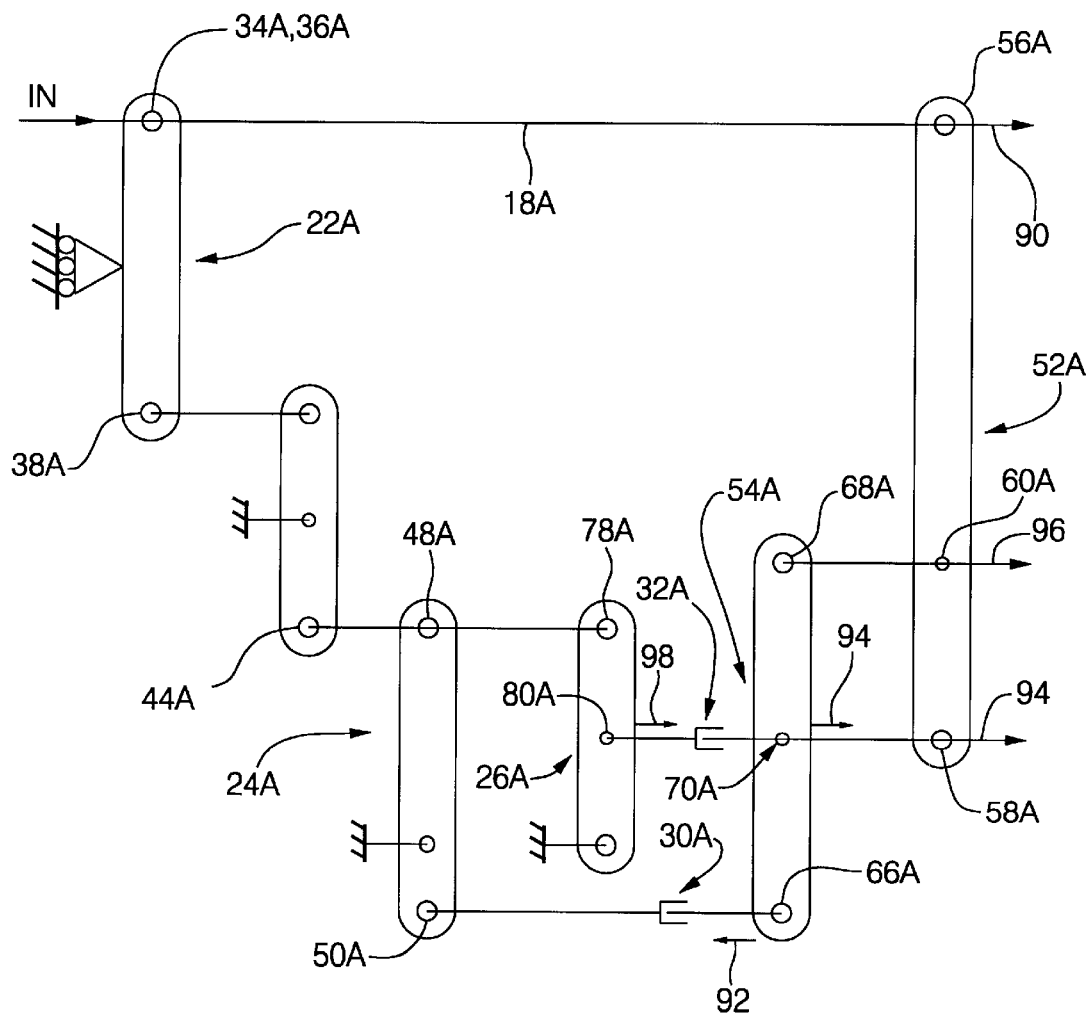
FIG. 2 is a lever diagram of the power transmission portion of the powertrain illustrated in FIG. 1.

The lever representation, shown in FIG. 2, has a plurality of nodes and fulcrums. The nodes have been given the same numerical designation to correspond with the components in FIG. 1 with the addition of an "A" suffix. For example, in the CVU 22, the designation 22A has been used, the nodes 34A, 36A represent the input discs 34 and 36, and the node 38A represents the output disc 38. The transfer gear node 44A is shown with its connection to the transfer gear node 48A. The lever 24A represents the transfer gearing 24 and the lever 26A represents the transfer chain mechanism 26. The clutches 30 and 32 have been given the designations of 30A and 32A, respectively. The planetary gear sets 52 and 54 are represented by levers 52A and 54A, respectively.

Those skilled in the art will recognize that the input shaft 18A will provide or induce a vector 90 on the node 56A which extends rightward in FIG. 2. When the clutch 30A is closed, the levers 22A and 24A will enforce a leftward vector 92 on the node 66A. When the clutch 32A is engaged, the levers 22A and 26A will enforce a vector 94 on the node 70A.

When the clutch 30A is engaged, the vector 92 will vary from a minimum value to a maximum value as the ratio of the CVU 22 is varied from an underdrive to an overdrive. During this mode of operation, the vectors 90 and 92 impose a variable vector 96 on the node 60A. When the vector 92 is at a minimum value, the vectors 90 and 92 will combine to impose a rightward vector on the node 60A, and when the vector 92 is at a maximum value, the vectors 90 and 92 will combine to impose a leftward or negative vector 96 on the node 60A.

Obviously, at a point between the minimum and maximum values of the vector 92, the vector on the node 60A will be zero, thereby producing a neutral condition. There will also occur a point at the minimum value of vector 92 that the vector 94 and a vector 98 imposed on the node 80A will be equal, thereby permitting the clutch 32A to be engaged without any speed differential across the clutch plates. At this point, the continuously variable power transmission 14 can be changed from the low mode to the high mode by the interchange of the clutches 30A and 32A without any interruption in power flow being sensed by the operator.

After the interchange, the ratio of the CVU 22 can be increased from the maximum underdrive condition toward the maximum overdrive condition to thereby increase the size or length of the vector imposed on the node 70A and the node 58A. As this vector increases, the vector 96 at the node 60A will also increase, thereby resulting in an increase in forward speed for the powertrain 10.

Those skilled in the art will recognize that the planetary gear arrangement 28 provides a four-node lever arrangement in which the lever arrangement has two input vectors 92 and 90 during the low mode of operation, and two input vectors 90 and 94 during the high mode of operation. By controlling the value of the vectors 92 and 94, the output speed or the output vector 96 is controlled, as is the interchange between the two modes of operation.

It is important to note that during the high mode of operation only a portion of the power is transmitted to the continuously variable unit 22 and the remainder of the power is delivered directly to the planetary gear set 52. This greatly improves the overall efficiency of the powertrain during this mode of operation.

During the reverse operation, in the low mode of operation, power recirculates within the continuously variable unit 22 in a manner which causes the CVU 22 to carry more power than the input power of the transmission, while in the forward operation of the low mode, the power recirculates in the opposite direction. Thus, the efficiency in the reverse mode is lower than the efficiency in the low forward mode. This is somewhat similar to the continuously variable transmission that has been proposed in the prior art. However, since the majority of the operation of the powertrain will occur during the high forward mode, the overall efficiency of the unit is improved above the prior units.

What is claimed is:

1. A powertrain having an engine and a continuously variable transmission comprising:

a continuously variable drive unit having a range of speed ratios from underdrive to overdrive;

a planetary gear arrangement having a pair of planetary gear sets each including three rotatable members and a pair of torque transmitting members interconnected with the planetary gear arrangement;

an input shaft continuously connected with the engine, a member of one of said planetary gear sets and an input member of said continuously variable drive unit;

a first transfer drive mechanism drivingly connected between the continuously variable unit and a first of said torque transmitting mechanisms;

a second transfer mechanism drivingly connected between said continuously variable unit and a second of said torque transmitting mechanisms;

the first torque transmitting mechanism being engaged to provide a low range of operation including a reverse range, a neutral condition, and a forward range; and said second torque transmitting mechanism being selectively operable to provide an input drive path to said planetary gear arrangement in combination with an input drive path from said engine to provide a split torque drive between said input shaft and an output shaft.

2. The powertrain having an engine and a continuously variable transmission defined in claim 1 further wherein:

said three rotatable members of said planetary gear sets include a sun gear member, a ring gear member and a planet carrier assembly member and said ring gear member of one of said planetary gear sets is continuously connected with the carrier assembly member of the other of said planetary gear sets and with said output shaft.

3. The powertrain having an engine and a continuously variable transmission defined in claim 2 further wherein:

said planet carrier assembly member of said one planetary gear set is continuously interconnected with said ring gear member of said other planetary gear set.

4. The powertrain having an engine and a continuously variable transmission defined in claim 3 further wherein:

said engine is continuously drivingly connected with said sun gear member of said other planetary gear set.

5. A powertrain having an engine and a continuously variable transmission comprising:

a continuously variable drive unit having an input member continuously connected with said engine and an output member, and being operable to provide a range of speed ratios from underdrive to overdrive;

a planetary gear arrangement having first and second planetary gear sets each including a sun gear member, a ring gear member and a planet carrier assembly member, and first and second selectively engageable clutch assemblies interconnected with the planetary gear arrangement;

a first transfer drive mechanism drivingly connected between said output member of said continuously variable unit and said first clutch assembly;

a second transfer mechanism drivingly connected between said output member of said continuously variable unit and said second clutch assembly;

said first clutch assembly being engaged to provide a low range of operation including a reverse range, a neutral condition, and a forward range;

said second clutch assembly being selectively operable to provide an input drive path to said planetary gear arrangement in combination with an input from said engine to provide a split torque drive between an engine input shall and an output shaft;

said sun gear member of said second planetary gear set and said input member being continuously interconnected with the engine;

said first clutch assembly being operatively connected with said sun gear member of said first planetary gear set;

said second clutch assembly being operatively connected with both said planet carrier assembly member of said first planetary gear set and said ring gear member of said second planetary gear set; and said ring gear member of said first planetary gear set and said planet carrier assembly member of said second planetary gear set being continuously interconnected with said output shaft.

* * * * *